United States Patent [19]
Dvorchik et al.

[11] Patent Number: 5,772,877
[45] Date of Patent: Jun. 30, 1998

[54] APPARATUS FOR MAGNETO-FLUIDIC WATER/OIL SEPARATION

[76] Inventors: Simon Dvorchik, 2123 Shady Ave., #B6, Pittsburgh, Pa. 15217; Igor Dvorchik, 215 Sunset Dr., Pittsburgh, Pa. 15146

[21] Appl. No.: 596,416

[22] Filed: Feb. 2, 1996

[51] Int. Cl.$^6$ .............................. B01D 35/06; C02F 1/28
[52] U.S. Cl. .................... 210/223; 210/222; 210/255; 210/257.1; 210/521; 210/925; 210/62.51 R
[58] Field of Search .................................. 210/222, 223, 210/521, 695, 252, 255, 257.1, 922, 925; 252/62.51 R

[56] References Cited

U.S. PATENT DOCUMENTS

| | | |
|---|---|---|
| 3,635,819 | 1/1972 | Kaiser . |
| 3,657,119 | 4/1972 | Turbeville . |
| 3,717,573 | 2/1973 | Warren . |
| 4,497,708 | 2/1985 | Young . |
| 4,935,147 | 6/1990 | Ullman et al. . |
| 5,147,045 | 9/1992 | Chi et al. . |
| 5,147,573 | 9/1992 | Chargnon .................. 252/62.51 R |
| 5,244,580 | 9/1993 | Li . |

OTHER PUBLICATIONS

B.A. Bolto; Magnetic Particle Technology for Wastewater Treatment, 1990, pp. 11–21.

Primary Examiner—David A. Reifsnyder
Attorney, Agent, or Firm—Michael J. Kline; Carol I. Bordas

[57] ABSTRACT

A system for extracting oil from aqueous solutions or for extracting aqueous solutions from oil. The system imparts magnetic properties to the medium being extracted, using a multi-layer surfactant magnetic colloid. The system uses magnetic traps designed to efficiently extract the magnetic medium and remove it to a storage area.

22 Claims, 14 Drawing Sheets

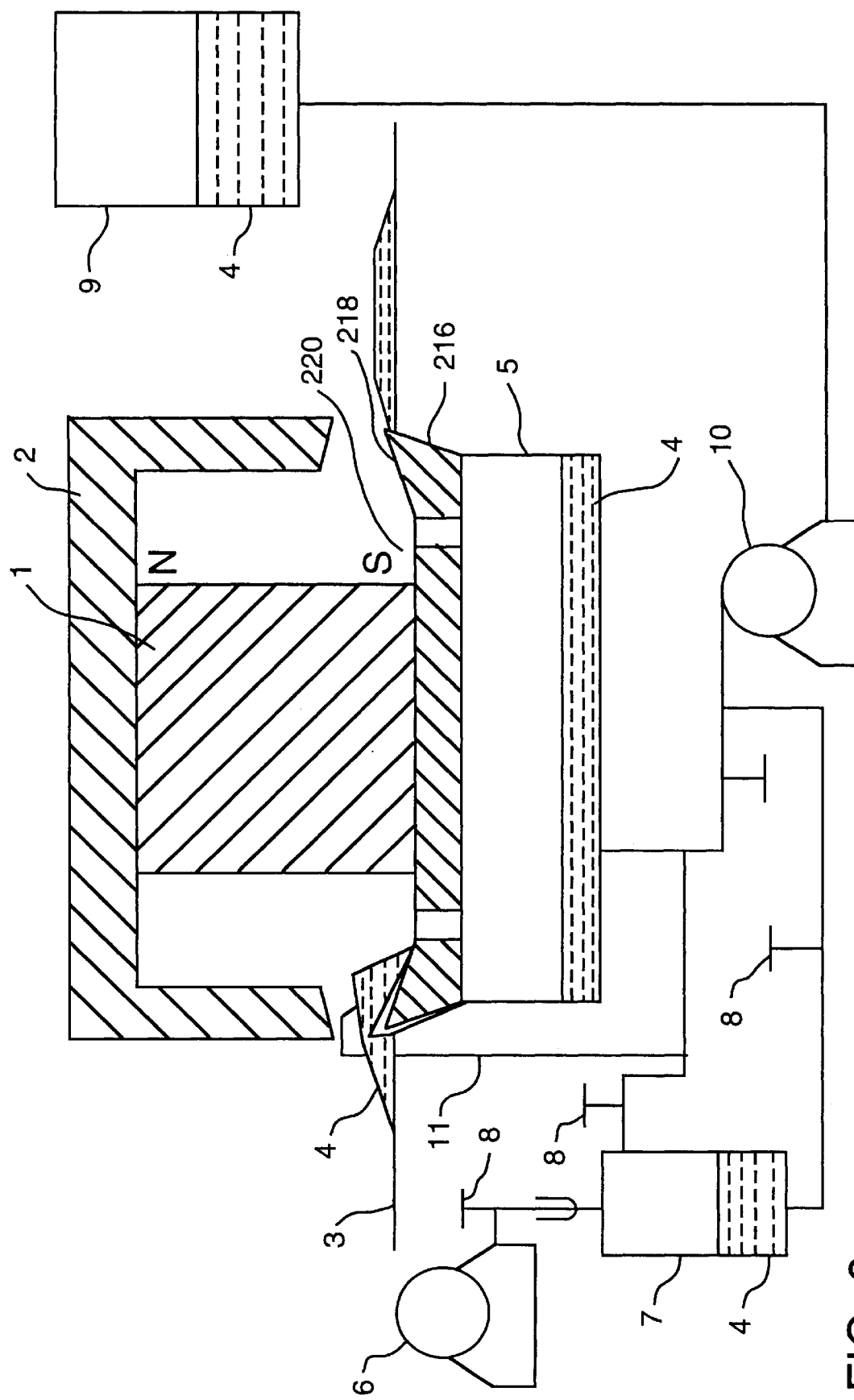

APPARATUS FOR MAGNETO-FLUIDIC WATER/OIL SEPARATION

FIELD OF THE INVENTION

The present invention relates to a method and apparatus for separating mixtures of water and oil, including water-in-oil and oil-in-water emulsions, oil spills on large water body surfaces, at accelerated separation rates.

BACKGROUND OF THE INVENTION

Oil pollution continues to be a matter of great concern. Such pollution can occur over long periods of time through small and even undetectable releases of oil caused by transportation of oil through pipelines, releases on roadways from automobiles, trains, etc., or through large and even catastrophic releases by tankers and barges carrying oil over oceans, rivers, and lakes. Similar catastrophic releases can occur as a result of seepage from oil tanks and at oil processing, production, recovery, and refining facilities.

As used herein, the term "oil" includes all forms of hydrocarbon-based, substantially water insoluble oils which are liquid or semi-liquid at the various extremes of temperatures encountered on the earth. Such oils, by way of example, include crude petroleum, gasoline, kerosene and other fuel oils, lubricating oils, transformer oils, cooling oils, machine oils, and other hydrocarbon-based oils whether occurring naturally or synthetically, regardless of composition and physical and chemical properties.

One of the problems encountered in oil and water separation techniques is that so many different properties affect the ability to separate a particular oil from water. Such properties include, by way of example, but not limitation, the oil's volatility, solubility in water, viscosity, density, surface tension, flash point, boiling point, pore point, chemical composition, and stability of the water-oil and oil-water emulsion for the particular oil.

Most oils are less dense than water, and because of their relative insolubility, tend to float on the surface of water from which clean-up is desired. Conventional methods of oil spill clean up take advantage of this natural buoyancy by attempting to skim the oil from the surface of the water. A primary problem with this method of removal relates to the tendency of oil to cover the entire surface area of water available to it, theoretically reaching an oil thickness approximating one oil molecule. As a consequence, it is impossible using current technology to quickly remove large quantities of spilled oil without also removing relatively large quantities of water, creating yet another water purification problem.

Additionally, skimmers using weirs and other threshold devices are not particularly effective at increasing the rate at which small submerged oil drops rise to the surface, and for this reason booms and different physical and chemical means are used in an effort to increase the rate at which small oil drops surface.

In the case of volatile oils, if the oil is not recovered quickly, its evaporation rate contributes to air pollution.

Contamination of water by volatile oils is especially dangerous to sewer networks wherein potentially explosive gas-air mixtures can form.

Another separation technique involves filtering oil from the water through powders or porous filter materials having great absorption surface areas and large affinity to oil, for example, active carbon. Such filters, however, allow only very low velocities on the order of 0.1–1 millimeter per second. In addition to the low throughput, such filters become fowled quickly, requiring frequent change-out.

Yet another difficulty encountered with respect to some oil-in-water and water-in-oil emulsions involves the small drop sizes and small density differences between certain oils and water, rendering quite difficult efforts to separate the two phases. There are known attempts to treat water magnetically to eliminate scale build-up in pipes and tubes. Magnetohydrodynamic (MHD) effects are used in such cases. These effects are based on the electric component of electromagnetic force which uses the difference in electroconductivity between water and oil, such as their different dielectric constant. According to the equation $f = q\bar{E} + \Sigma_o[P\bar{V}\bar{E}] + J \times B$, where $J = \sigma \cdot [\bar{E} + V \times B]$, $P = (\Sigma - \Sigma_o)\bar{E}$, where $f$=force of volume unit with charge q, electroconductivity $\sigma$ in electric field of electric intensity $\bar{E}$, magnetic field of flux density B; $\Sigma$, $\Sigma_o$=absolute permittivity and permittivity of vacuum, respectively, J=current density, V=velocity of medium, and P=dielectric polarization.

There are also known attempts to use the magnetic component of pondermotive force ($f = \mu_o[\bar{I}\nabla H]$, where $\mu$=magnetic permeability of vacuum, $\bar{I}$=magnetization of volume unit) in water treatment by imparting magnetic properties to the oil. In this method, magnetic particles are typically added to the oil and effort to impart to the oil magnetic properties. See, for example, B. A. Bolto, "Magnetic Particles Technology for Wastewater Treatment," Wastewater Management, Vol. 10, pages 11–21, 1990. See also, U.S. Pat. Nos. 4,497,708, 3,657,119, and 5,244,580.

Such methods have not, in general, been used commercially because of the practical difficulties of oil extraction using large magnetic particles. Generally, one extracts more particles than oil, and the gradient of the magnetic field employed causes non-uniform distribution of the magnetic particles in the oil. In addition, there is great difficulty in extracting the magnetic particles, once recovered, from the magnetic system employed.

Others have attempted to use magnetic fluids to impart magnetic properties to oil. See, e.g., U.S. Pat. No. 3,635,819. Such fluids are quite expensive, and sink in water, because they require a high concentration of magnetic particles (0.5–4.0%). Prior art magnetic colloids must have a much higher concentration of magnetic particles and accordingly high density, that is, higher than the density of water. These methods could not employ smaller concentrations of magnetic particles in magnetic oils because they employed the "minimum proportion of surfactant, . . . lower proportion than usually present in ferrofluids." In this case one could not affect magnetic forces on weak magnetic oils, but could only affect magnetic forces on the magnetic particles. Rotating magnetic systems could not also employ such weak magnetic oils.

Accordingly, it is an object of the present invention to provide a system for imparting weak magnetic properties to oil to be separated from water that results in less expensive, more rapid and complete removal of the oil from the water and allows surface clearance of even very thin layers of oil spills quickly.

Another object of the invention is to create magnetic systems (magnetic traps) which can affect magnetic forces on weak magnetic liquids, capture those liquids, and further include means for removing such magnetic liquids captured by the magnetic traps.

Yet another object of the invention is to create a magnetic colloid which decreases the oil viscosity and thereby increases its mobility, thereby improving the ability to contain the oil spill.

Yet another object of the invention is to minimize, if not eliminate entirely, the amount of water contained in the collected oil. Yet another object of the invention is to provide a system whereby high volume cleaning of oil-water mixtures may be achieved at velocities up to one meter per second.

Yet another object of the invention is to provide an oil recovery system having a cleansing ratio of up to 10,000.

Still another object of the invention is to provide a system that allows for the reuse of oil collected and the creation of a closed water loop with water and oil recycling systems.

Yet another object of the invention is to provide a magnetic colloid and/or commercially feasible magnetic fluid for use in practicing oil recovery techniques.

Still another object of the invention is to provide improved magnetic traps for high speed recovery of oil spills.

These and other objects of the invention will become more readily apparent as the following detailed description of the preferred embodiments proceeds, particularly with reference to the drawings.

SUMMARY OF THE INVENTION

As will now be more fully described, according to our invention, oil to be recovered is transformed into an ultra stable magnetic colloid, which contains only the minimum required magnetic particles. This stable magnetic colloid is then removed from the water by specially designed magnetic traps. This provides an effective magnetic method and apparatus for cleansing water of oil and vise versa.

These and other objects and needs are satisfied by the method and apparatus of the present invention, which makes possible the collection of oil at rates as high as 10 tons per hour per meter of magnetic trap perimeter at wastewater flow rates ranging anywhere from 1 to 10,000 tons per hour. The invention allows film thicknesses of as little as 0.01 millimeters to be removed. The cleaning ratio for volumetric clearances may be as high as 10,000 if the initial pollution index corresponds to 1,000 to 10,000 milligrams per liter, and the cleaning ratio is between 100–1,000 if the pollution index is 20–100 milligrams per liter.

According to the invention, in a preferred embodiment, improved magnetic skimmers are employed which utilize two plates comprising magnetically permeable steel facing each other and separated by a yoke about which an electromagnet is placed. At the edges of the plates, the minimum separation gap between the plates is about 5–20 millimeters and the attraction between the plates is on the order of 10 tons. The weight of the skimmer for small flowrates is about 40 kg, for larger flowrates, about 85 kg. Both skimmers are given for two preferred embodiments with varying and constant gap along circle.

IN THE DRAWINGS

FIG. 6 is the schematic representation of a process diagram employing a magnetic trap of the present invention similar to that of FIG. 4 with a magnetic oil collector and a vacuum pump for removal of the collected magnetic oil from the magnetic trap.

FIGS. 13A–E are cross sectional views of models of preferred magnetic skimmers of the present invention.

Figure 14:
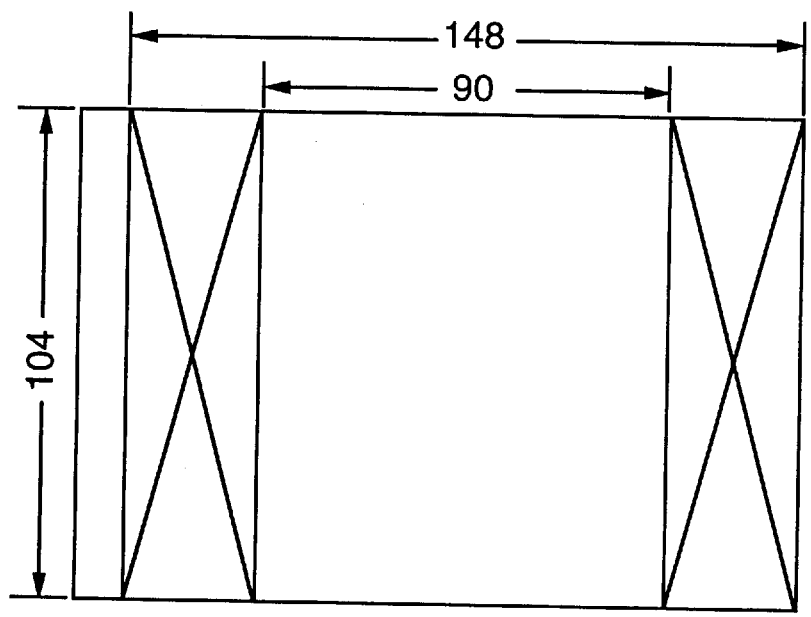

FIG. 14 is a schematic representation of coil specifications for a small skimmer of the present invention.

Figure 15A:
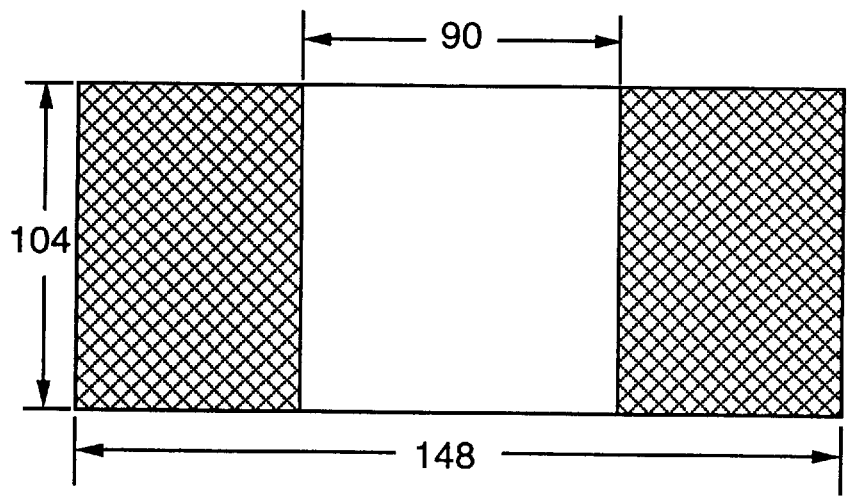
Figure 15B:
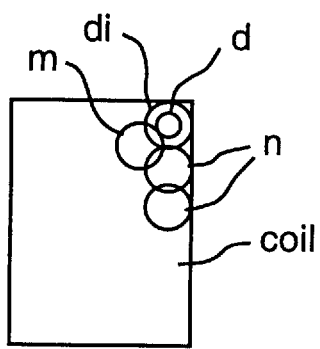
Figure 15C:
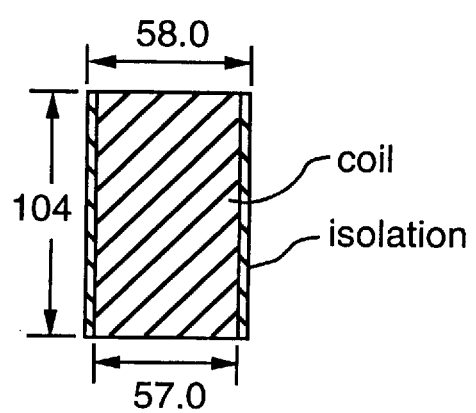

FIG. 15 is a schematic representation of the coil dimensions for the coil of FIG. 14.

Figure 16A:
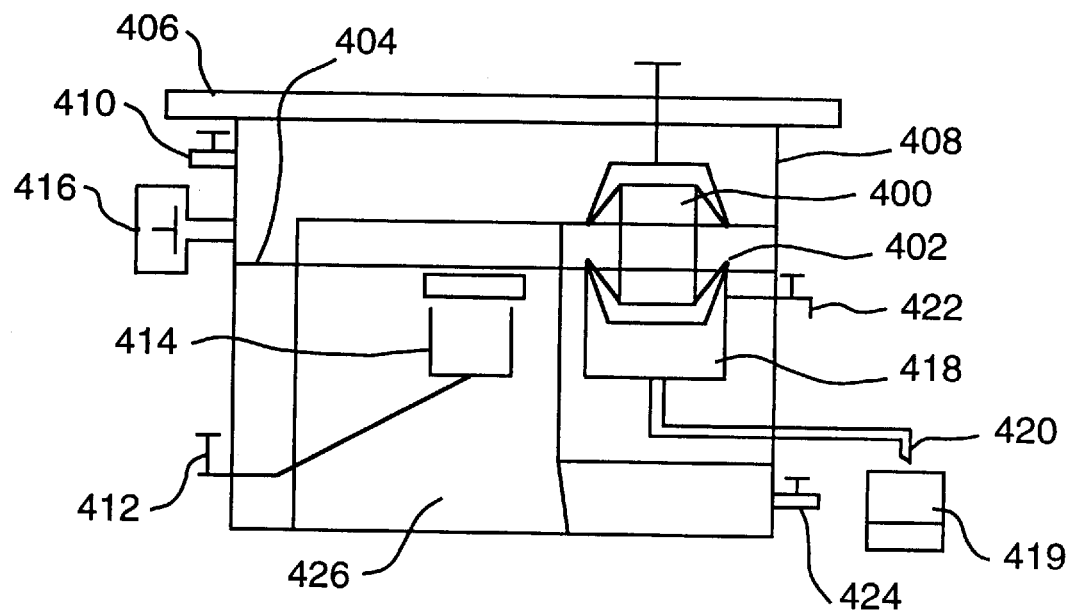
Figure 16B:
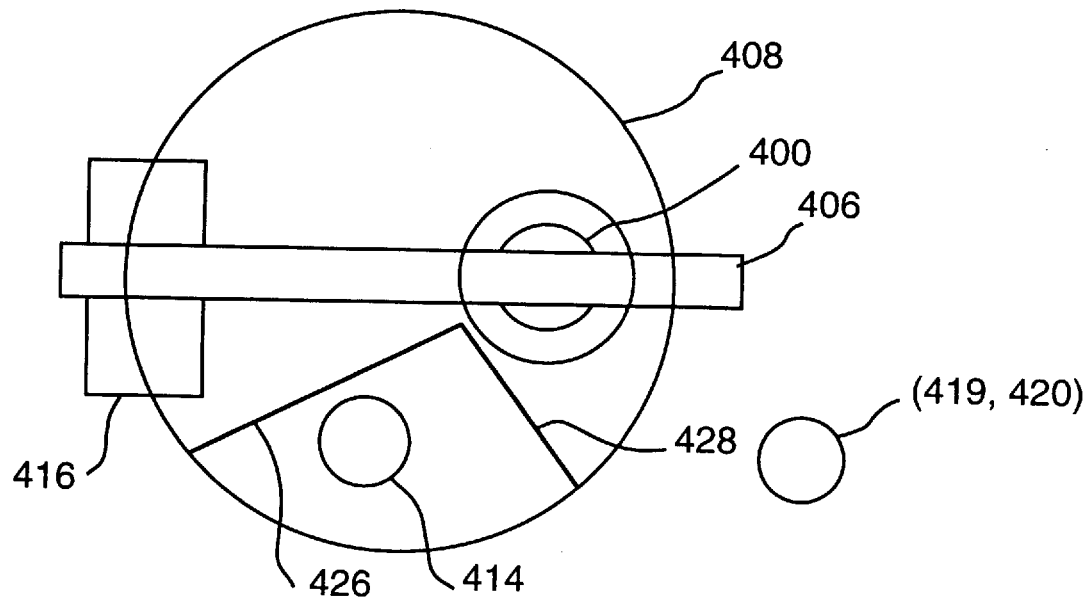

FIGS. 16A–B are schematic representations of a preferred skimmer and tank assembly of the present invention for water/oil separation in a contaminated tank-accumulator.

Figure 17:
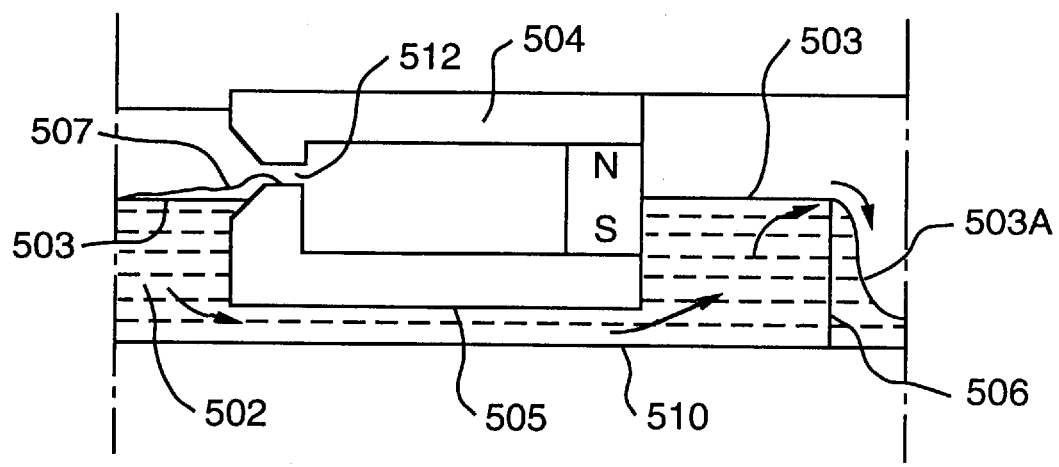
Figure 18:
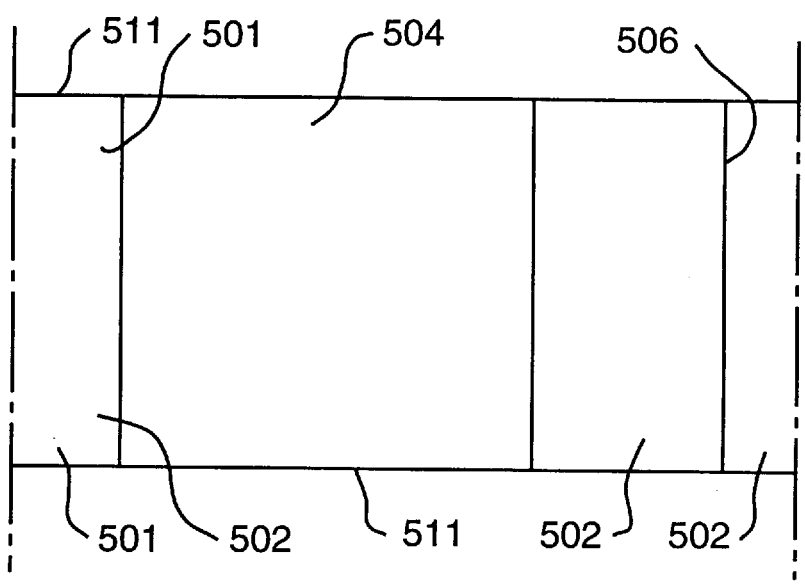

FIG. 17 is a partial cross sectional view of a preferred magnetic trap of the invention, illustrating partially immersed partitions FIG. 18 is an overhead view of the device of FIG. 17.

Figure 19:
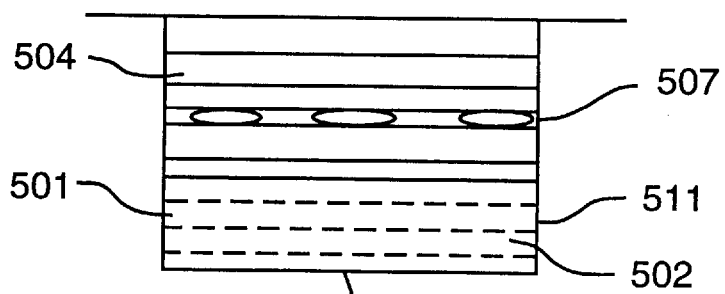

FIG. 19 is a front elevational view of the device of FIG. 17.

DETAILED DESCRIPTION OF THE PREFERRED EMBODIMENTS

Figure 1:
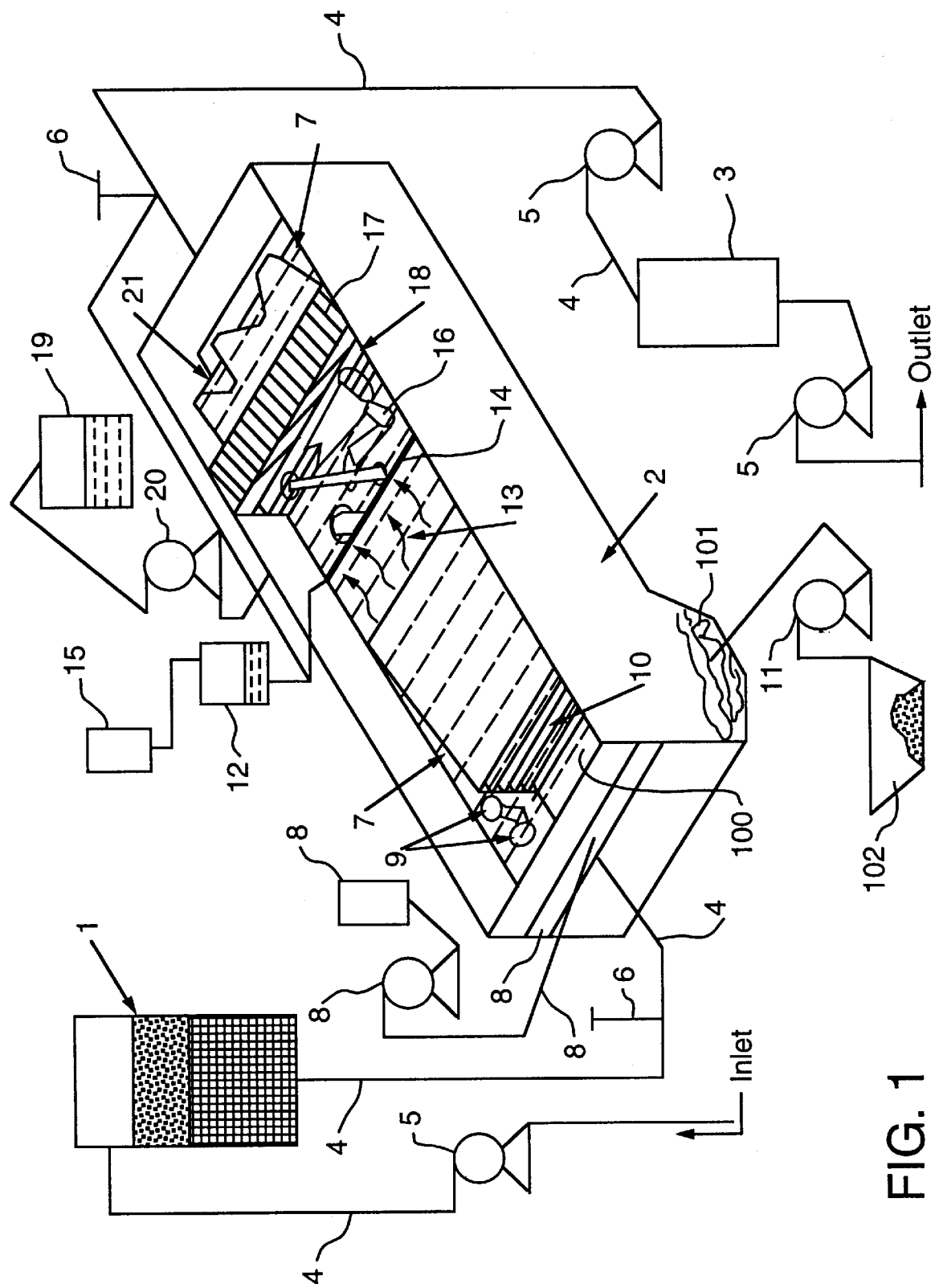
FIG. 1 is a schematic representation of a system for adding a magnetic colloid for use in separating oil from water in waste water treatment.

A system for water purification incorporating a preferred embodiment of the present invention is shown diagrammatically in FIG. 1. Contaminated water is pumped from an inlet by a water pump 5 into a tank or accumulator 1, connected by pipes and valves with a settling basin 2 for coalescing the oil particles or droplets and settling solid particles such as mud, sand, silt, or powder. The basin 2 is connected to a filter 3 at its outlet.

The basin 2 includes an inlet region 100 which allows the drops of oil 9 float to the water surface 7 with help of conventional means for increasing the drop sizes and accelerating of their separating rate. In the embodiment of FIG. 1 inclined thin sheets 10 fabricated of hydrophobic plastics such as polychlorvinyl or polystyrene or metals such as copper, aluminum or alloys thereof or stainless steels and oleophilic hydrophobic cords 13 are used to accelerate the coalescence of oil droplets. The inlet 100 of the settling basin also includes a system 11 for mud, sludge, silt, and sand removal such as a sludge pump 11 which draws the mud, sludge, sand, etc. 101 from the inlet, pumping it to a collection bin 102. The basin 2 also includes a semi-immersed partition for oil retention (which partition may be part of a partitioned magnetic trap) and a weir 21 for controlling water level.

According to the present invention, a magnetic colloid 12 is delivered to the water surface 7. The system includes controls for controlling the amount of magnetic colloid 15 added, and a delivery device, such as an array of spray nozzles 14, for adding the magnetic colloid 15 to the water surface 7 at a point downstream from the system inlet 100, but sufficiently upstream of the magnetic trap 17 to permit mixing of the magnetic colloid and oil. The system also includes a magnetic trap 17 with a working gap between poles 18, and a system 8 for mixing the oil and magnetic colloid thereby increasing the mobility of the oil. The system also includes a tank 19 for storing magnetic oil, removed from the system by the magnet 17, and pumped out of the basin 2 by a pump 20.

The system also preferably includes a suction [vacuum] pump for removal of magnetic oil from the magnetic gap, a system for adding the magnetic colloid to the water volume, and a magnetic filter as an augment to filter 3 or in place of filter 3. Additionally, the system may include a system for the removal of magnetic particles and surfactant from the recovered magnetic oil and a system for the recovery of magnetic colloid.

The preferred method of the invention is to use a stable magnetic colloid, also referred to as a magnetic fluid, defined as a colloid of very small (sub-domain) magnetic particles with a size on the order of 50 A°–100 A° in a liquid carrier, with an excess of a multi-layer surfactant, comprising a stabilizing dispersing agent, which prevents the particles from agglomerating even when a strong magnetic field gradient is applied to the colloid. It is preferred that close contact between particles be avoided if a stable colloid is to be obtained. Short range interactions between particles in the form of magnetic dipole-dipole interactions and van der Waals' forces of attraction, cause aggregation of particles in spite of thermal agitation, i.e., Brownian motion. Long range interactions between particles caused by gravity and magnetic gradient forces could lead to a loss of part of the liquid from the colloid. The velocity of spherical particles, suspended in a liquid-carrier, undergoing Brownian motion in gravitational and magnetic fields, would be described by the following equation:

$$v = \frac{d^2}{18\eta}\left[(\rho_P - \rho_0)g + \mu_0 I \frac{dH}{dx}\right]$$

where: $\eta$=viscosity of colloid, I=magnetization of magnetic particles. $\rho_p, \rho_o, \rho$=density of particles, liquid-carrier and colloid accordingly, g=gravity acceleration. dH/dx= magnetic field gradient, $\mu_o$=magnetic permeability of vacuum, and V is the terminal velocity.

Taking into consideration that the field gradient could be about $10^8$–$10^9$ A/m$^2$ for real magnetic systems (without using superconductivity) it will be understood from comparing magnetic forces [where q is a concentration of magnetic particles in the liquid magnetic medium] and gravity forces [$\rho g$] that only small concentrations (q=0.02–0.2%) of magnetic particles are required to impart magnetic properties to the oil. In this case, the strength of the magnetic field gradient is equivalent to hundreds and thousands that of the gravitational field. So, in equation [1] gravitational force may be disregarded, leaving only magnetic force, and estimation gives us: V=$10^{-7}$–$10^{-8}$ m/sec, meaning that a single magnetic particle could travel about 100 A° in about 1 second.

Figure 2:
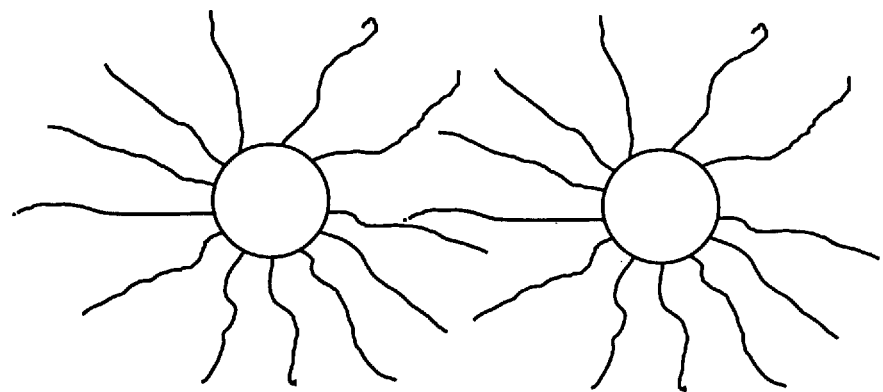
FIG. 2 is a schematic representation of magnetic particles exhibiting stearic (entropic) repulsion by an absorbed organic surfactant for single absorption sites (single layer) in a magnetic colloid.
Figure 3:
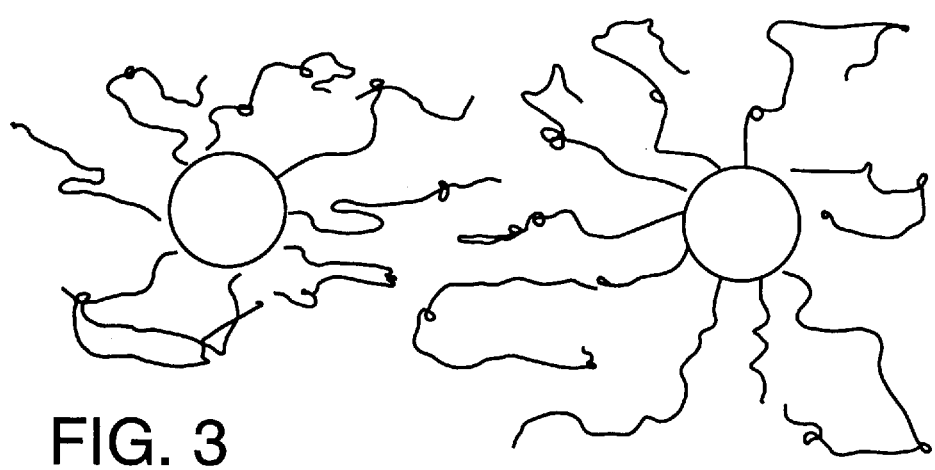
FIG. 3 is the same as FIG. 2 but for multiple layers.

Two types of repulsion are used in colloid chemistry: stearic and electrostatic repulsion. In the case of hydrocarbons, stearic repulsion is used to achieve stability. The particle's surface is coated with long chain molecules [20 A°–30 A° in length] represented schematically in FIG. 2. In order, however, to achieve a low concentration of particles, (e.g., 0.02–0.2% by weight of oil) it is necessary to employ a multiple-layer surfactant, illustrated in FIG. 3. If the tails of the long chains are compatible with the liquid-carrier, they cause repulsion between the particles over longer distances than would be possible with the particles of FIG. 2. Accordingly, the liquid-carrier must be a good solvent for the long chains. Therefore, in the case of cleaning water of oil, it is necessary to use as the surfactant a material that is insoluble in water, or hydrophobic, and oleophilic, with multiple layers, and in excess (about 1.5–3 times more than usually present in ferrofluids, i.e. about 5–25% by volume).

The Boltzmann equation, as applied to the process of the invention, shows the equilibrium distribution of the colloid concentration and predicts the properties of the surfactant sufficient for obtaining a homogeneous colloid:

$$-[W_v + W_d + W_g + W_m - \Pi(x)S]/kT \quad q = q_o e \tag{2}$$

where $W_v$, $W_{dd}$, $W_m$, $W_g$, $\Pi[x]S$=energies of van der Waals' forces of attraction (short range action), of magnetic dipole-dipole interaction (short range also), of magnetic forces in an external magnetic field, of gravity, and of stearic or electrostatic repulsion (the last three with long range action), respectively. Here we consider the case in which all these forces act in one direction.

If $W_m - \Pi[x]S \ll 1$ at a great distance between the particles the concentration of the particles will not vary significantly, and the colloid may be regarded as homogeneous. To achieve this, as previously stated, a multiple layer surfactant in excess is necessary. One of the best colloids for use in practicing the present invention is a colloid based on kerosene as the liquid-carrier (about 75–95% in volume), with magnetic particles of a magnetite (0.5–2% in volume) and oleic acid in excess as a surfactant (5–25% in volume). Kerosene decreases the viscosity of oil even in cold weather conditions which would otherwise render difficult magnetic oil recovery.

Sometimes it might be convenient to produce the colloid in situ with the oil to be extracted, in which case a suitable surfactant would need to be selected dependant upon the physical properties encountered.

The density of the colloid useful in practicing the present invention could advantageously be less than the density of water, particularly in the case of surface skimming of oil. The concentration of particles might be calculated from the equation:

$$q = \frac{\rho - \rho_o}{\rho_p - \rho_o}$$

where $\rho$, $\rho_o$, $\rho_p$=densities of magnetic colloid, $\rho_p$–0 liquid carrier and particles, respectively. [3]

It is preferred to use a magnetic colloid having a concentration of magnetic particles q ranging from 0.52–2.0%, which dictates that magnetization of the colloid should be in the range of 2–8 kA/m.

A highly prepared magnetic colloid of the invention comprises, by weight 72–83% kerosene or liquid-carrier, 3–12% magnetite or the magnetic particles, and 5–25% oleic acid or the multi-layer surfactant. Other magnetic particles, preferably 50–100 angstroms particle size, could be used, such as berthollide or maghemite or mixtures of the aforementioned particles. Other liquid carriers, such as hydrocarbons, including benzene or anthracene could be used. It may be advantageous to employ as the liquid-carrier the same type of oil being extracted from the aqueous solution. For example, benzene is especially useful if the source of oil pollution is benzene. Other liquid-carriers such as machine oils and lubricating oils could also be used, as well as any other liquid-carriers which will now be apparent to those of ordinary skill in the art. The multi-layer surfactant, in addition to comprising oleic acid, could include stearic acid, hehadecanoic acid and fatty acids.

In order to remove small amounts of water (or an aqueous solution, such as seawater) from oil, in order to clean the oil, it is necessary to use a water-based magnetic colloid. The stability of water colloids is higher when electrostatic repulsion is used.

In this system, an accumulator gathers the mixture of oil polluted with water or aqueous solution. A water-based magnetic colloid is introduced into the mixture, which is then agitated to allow the colloid to mix with the aqueous solution. The resulting mixture is then forced through a high gradient magnetic filter, for example, with pumps. The filter includes two outlets, one for discharging and collecting clean oil, the other for discharging and collecting extracted aqueous solution.

The most economical way of producing the magnetic colloids of the present invention is to use chemical reactions of two and three-valence ferrium [iron] salts in water with rapid addition of an excess of alkali with further transference of the magnetite [$Fe_3O_4$] particles in the liquid-carrier with an excess of surfactant. For example:

$$8NaOH+2Fe^{*}+Fe^{}=Fe_3O_4+8Na^*+4H_2O \quad [4]$$

A preferred method, but not the only method, of preparing the magnetic colloid of the present invention involves placing an aqueous solution of two and three-valence ion salts in a chemical reactor, then pouring in a solution of the liquid-carrier (e.g. kerosene) and surfactant (e.g. oleic acid), followed by the rapid addition of alkali and simultaneous mixing of the mixture for several minutes. After settling, about 20–40 minutes after mixing, the mixture separates into two layers, a top layer comprising magnetic colloid, and a bottom layer comprising an aqueous solution of salts, such as alkali metal salts. The bottom layer is decanted from the reactor vessel, leaving the magnetic colloid and a thin layer of residual aqueous solution. The residual water in the aqueous solution is driven off by heating the reactor just enough to boil away the water from the residual aqueous solution. As the water is driven off, the temperature of the colloid may need to be increased to 105°–110° C. to boil off the remaining residual water from the aqueous solution.

The iron salts used in forming the aqueous solution of two and three valence iron salts may include, according to equation [4], for example, iron chloride, iron nitrate, or iron sulfate. The alkali may include, for example, sodium, potassium, or ammonia alkali. Preferably, an excess of alkali (about 1.5 times theoretical of equation [4]) is used.

Such a magnetic colloid provides the following advantages in water treatment:

1. After mixing with oil the medium acquires weak magnetic properties and becomes a stable magnetic colloid.
2. The viscosity of the colloid might be much lower than that of the initial oil.
3. The low density of the colloid facilitates the creation of surface water clearance systems.
4. Surface clearance is possible even in the case of very thin oil spills.
5. High volume clearance of oil could be done using filters with practically unlimited dirt capacity.
6. The systems with the magnetic colloids of the invention might be installed at newly constructed plants or incorporated into the existing facilities, because of the compatibility with oil traps and other existing devices, including up-to-date equipment for magnetic and magnetohydrodynamic [MHD] methods of water treatment.

Usually, the loss of magnetic colloid can be reconciled in view of the oil extracted, but it is occasionally beneficial to remove the magnetic particles and surfactant from the magnetic oil for magnetic colloid recovery. This is accomplished by breaking the affinity between the oil and surfactant by adding chemicals such as phenol, acetone, and carbon tetrachloride.

Figure 4:
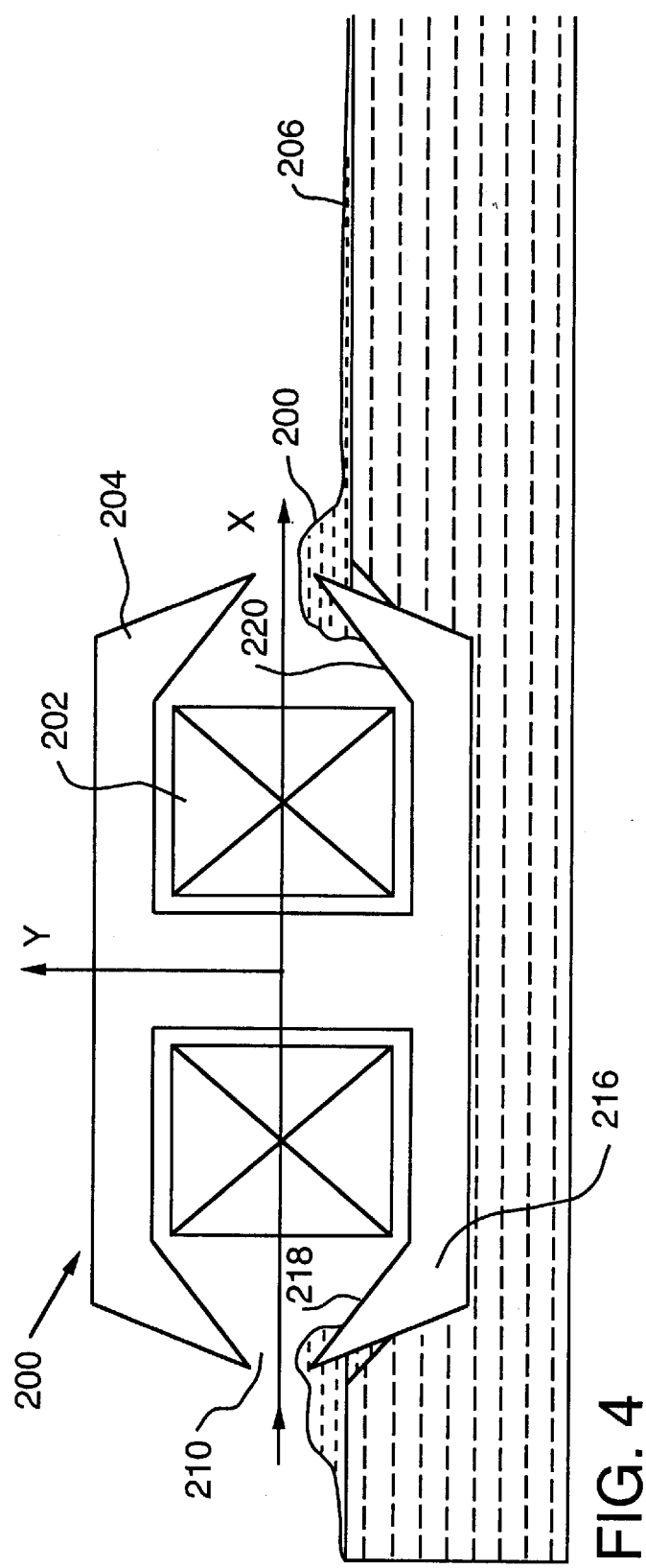
FIG. 4 is a schematic representation of a round-shaped magnetic trap or skimmer of the present invention, illustrating water level and magnetic field gradient.

Once the oil is rendered magnetic by addition of the stable magnetic colloid of the invention, the next step is to use an appropriate magnetic system, which can recover magnetic oil with even very weak magnetic properties. FIG. 4 illustrates a round-shaped magnetic trap, or skimmer, 200 with a current coil 202. This shape is convenient for surface cleansing. FIG. 4 also depicts the magnetic circuit 204 of the skimmer 200, the water surface level 206, the position of magnetic oil 208 and

horizontal $\partial H/\partial x$ and vertical $\partial H/\partial x$ gradients of magnetic field near the working gap 210 of the magnetic trap 200. As illustrated, the water level 206 is located below the gap 210, and the vertical gradient (Y) of the magnetic field is directed opposite gravity. In this way, magnetic oil is drawn upwardly, out of the water, into the gap 210, and collected by the trap 200. As illustrated in FIGS. 4, 6, 11A, 13 and 16, the lower magnetically permeable plate 216 includes an inclined surface 218 down which oil 208 may flow once drawn into the trap 210 by the magnetic fields. The oil flows into a lower region 220 of the lower plate 216. In a highly preferred embodiment of the invention, the lower plate 216 includes drainage holes 222 through which the collected oil may pass in order to be collected.

It is also preferred when extracting magnetic oil with the device of FIG. 4 to create a magnetic field gradient in a polar (X) direction. This component of the gradient magnetic field draws the magnetic oil into the trap 200.

Instead of the current coil 202, a permanent magnet could be employed with respect to all magnetic traps considered here. If, however, a permanent magnet is used, it would generally be necessary to remove the magnetic oil from the magnet poles by a vacuum pump, particularly when polluted water has not entered the skimmer continuously. Also, when the skimmer is not continuously operated, dry magnetic colloid might fill up the working gap 210 of the magnetic trap 200, and for this reason, the skimmer is preferably operated continuously.

Occasionally, it might be convenient to use an A.C. electromagnet as a magnetic trap with a laminated magnetic circuit, which allows extraction of the magnetic colloid from the magnetic trap. As noted previously, the gap 210 is preferably located just above the level of the water/oil mixture. The position of the gap might be varied and set in a number of different ways, e.g., with the help of pontoons, cranes, travelling blocks, etc.

Figure 5:
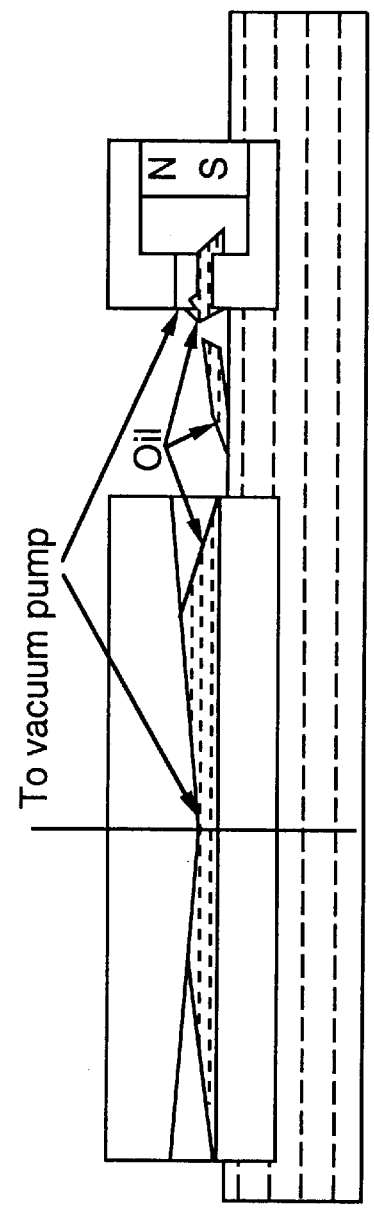
FIG. 5 is the same as FIG. 4, but with a generally C-shaped rectangular magnetic trap.

The skimmer illustrated in FIG. 5 has a rectangular C-shaped magnetic system with a permanent magnet and 3-dimensional field gradient. Not shown in FIG. 5 is a suction [vacuum] pump for magnetic oil extraction.

It is often convenient to use an intermediate collector for magnetic oil extraction, but, as previously mentioned, in the case of a permanent magnet it is generally necessary to increase the oil potential energy by using a suction [vacuum] pump. FIG. 6 illustrates different versions of vacuum pump operation, including use of an intermediate collector 5 from which collected oil is drawn off by a vacuum pump 6. Alternatively, extraction directly from the gap may be accomplished using branch pipes 11 connected to a vacuum pump. In FIG. 6 there are: 1-permanent magnet, 2-magnetic circuit, 3-water level, 4-magnetic oil, 5-collector, 6-vacuum pump, 7-intermediate capacity for extracted oil, 8-valves, 9-oil storage tank and pump 10 for oil transportation.

Figure 8:
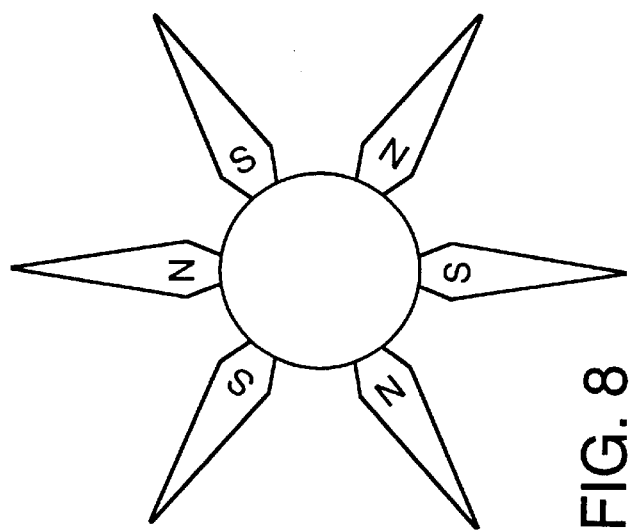
FIG. 8 is a schematic representation of a plan view of another round magnetic trap, wherein the magnetic poles are placed in a horizontal position.
Figure 7:
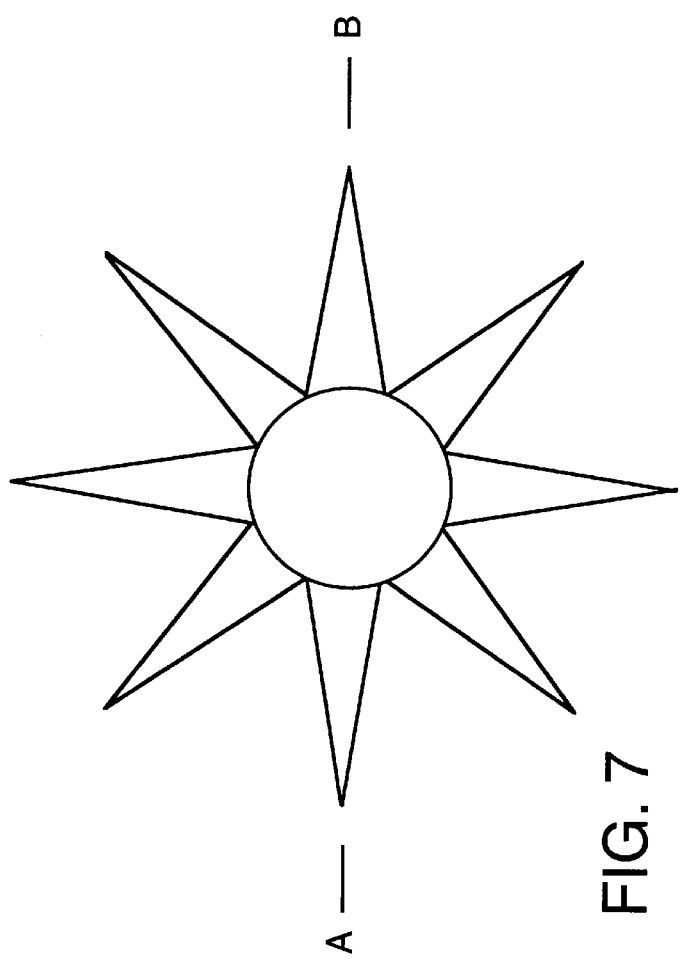
FIG. 7 is a top plan view of a round magnetic trap with vertically placed magnetic poles having a developed surface and long-range interaction.
Figure 7A:
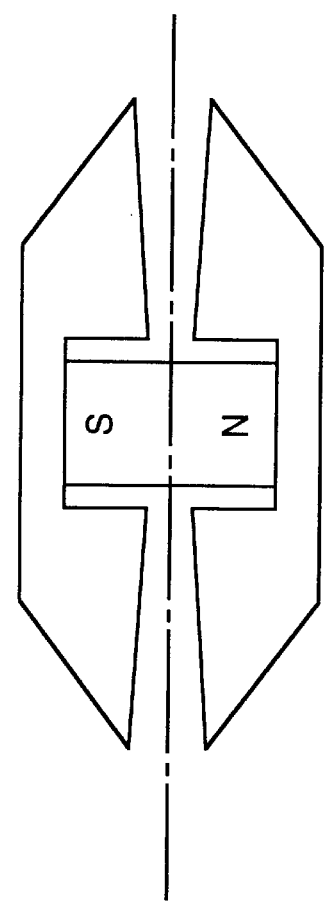
FIG. 7A is a cross sectional view of the trap of FIG. 7 taken along lines A–B.

In FIG. 7, 7A and FIG. 8 there are shown magnetic traps with expanded surface and long range of action, that increases productivity of oil gathering. The working gap in FIG. 7 might be located at different places [lower, upper]. Also shown is the $\phi$-gradient of magnetic field (along the perimeter of the gap).

Figure 9:
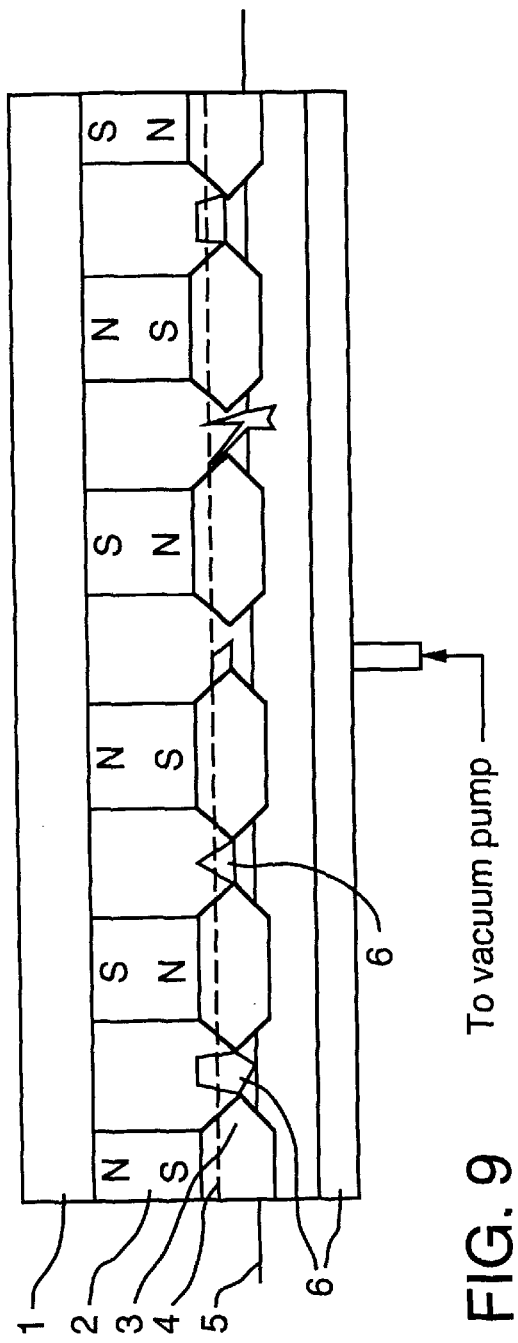
FIG. 9 is a schematic illustration of a multiple magnetic trap of the present invention.

Magnetic traps can be installed in such a way that they partition off the upper part of water flow when acted upon by a water stream. In FIG. 9 a multiple magnetic trap is shown, which partitions off the upper part of water flow. There are: 1-yoke of magnetic system, 2-permanent magnet, 3-pole pieces, 4-upper level of collector [weir], 5-water level, 6-magnetic oil extracted. Oil mixed with magnetic colloid moves toward the magnetic trap, which traps it, and water flows under the magnetic trap. The magnetic trap illustrated in FIG. 5 can be used for the same function.

In a preferred embodiment of the invention, the magnetic trap 504 illustrated schematically in FIGS. 17–19, includes a submerged or partially submerged partition 506 forming the back side of a channel 501 having a bottom 510 and sides 511. As illustrated by the arrows in FIG. 17, water 502 having magnetic oil 507 on its surface 503 seeks its level, the partition 506 acting as a weir allowing excess water 503A to overflow, maintaining the water level 503. Because oil 507 is less dense than water 503, the magnetic oil 507 is directed toward the gap 512 of the magnetic trap 504, positioned slightly above the water surface 503, and is impeded from flowing under the trap 504. The trap 504 is preferably free floating, maintained at a predetermined level with respect to the water surface 503, for example, with floats, such as pontoons (not shown)

Figure 10:
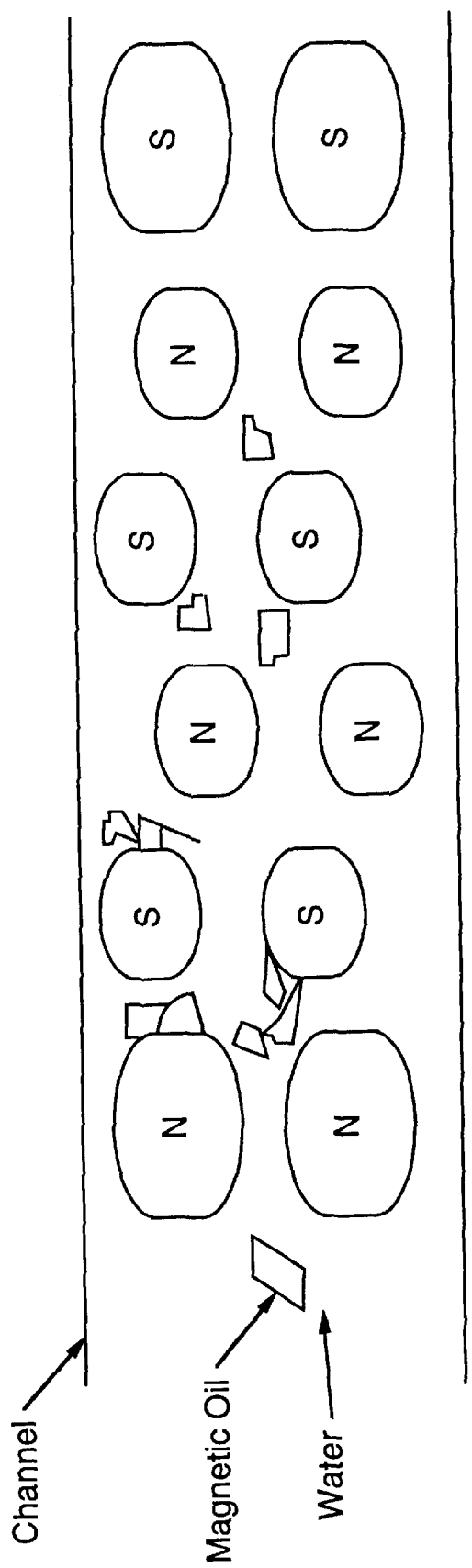
FIG. 10 is a schematic illustration of a streamlined multiple magnetic trap.

FIG. 10 is an overhead view, wherein a polluted water stream passes along or around multiple magnetic traps, letting magnetic oil overflow into the gaps of the magnetic traps. The individual skimmers illustrated in FIGS. 4, 5, 6, 7, 8 could be used for the same function, that is, arranged in an array similar to FIG. 10.

In all these cases, it is possible to use A.C. or D.C. electromagnets or systems with permanent magnets. Electromagnets must have a narrow loop of magnetic hysteresis.

Occasionally in surface water clearance systems [especially in "streamlined" magnetic traps as illustrated in FIG. 10] in addition to using long-range magnetic field gradient means, it is necessary to use means for creating high short-range magnetic field gradients. It is convenient to do this by placing a grid, net, or wool of thin magnetosoft wires on the water surface near the magnetic system gap. This prevents the capture or entrainment of magnetic oil by the water stream despite increased flow velocity.

In order to extract collected magnetic oil from the magnetic traps, it is sometimes possible to rely on gravity, a magnetic removal system, or oil demagnetization; in general, however, a suction pump of some type is required. The suction pump might be an oil-jet, vacuum, wing or thermomagnetic pump. The best way to coordinate productivity of the suction pump with oil arrival and collection is to use an intermediate capacity [collector], such as 7 in FIG. 6. Another way is to control, i.e., vary the flow rate, productivity of the pump, in accordance with oil arrival to the trap.

It is known that only a portion of oil drops in water rise to the surface, and very small drops (i.e., <0.1 mm) could not come to the surface in a reasonable amount of time. In order to clean such oil drops from the water, it is necessary to use filters. By adding the supplementary magnetic colloid of the invention to the water, it is possible to use special magnetic filters of the invention for a greater degree of deep water purification.

These filters use a combination of a high gradient short-range magnetic field within the entire volume of the filter in combination with a long-range gradient magnetic field, which varies according to specific rules discussed herein. Given that it is not difficult to obtain a high magnetic field gradient on the order of 10 T/m [v•sec/m$^3$], for a water velocity of about 0.5–1 m/sec through such a filter, that filter will have a very small size. A long-range field gradient allows us to remove with regularity magnetic oil from the filter, so that it becomes a filter having unlimited dirt capacity The presence of a multilayer surfactant in magnetic oil in accordance with the present invention is especially well suited for filters of this type, which might even extract dissolved oils from polluted water.

High gradients of magnetic field in a filter volume might be achieved by known methods, for example, by filling a volume placed in an external magnetic field with small objects of magnetosoft materials (such as small spheres, thin wires, steel wool, chips, thin nets), or, by using very thin wires through which is passed electric current.

A long-range gradient might be achieved by varying the gap of the magnetic system [between the magnetosoft poles of magnetic system or by introducing a magnetosoft body of the shape needed into the magnetic gap]. The magnetic filter might be separate or be built integrally with the magnetic trap of the surface cleaning system, using the leakage field. If some water is captured together with the magnetic oil, this is not a matter of great concern; oil can be continuously removed from the filter through a small opening allowing for seepage or periodically with a valve, controlled by a system designed for the purpose.

Figure 11B:
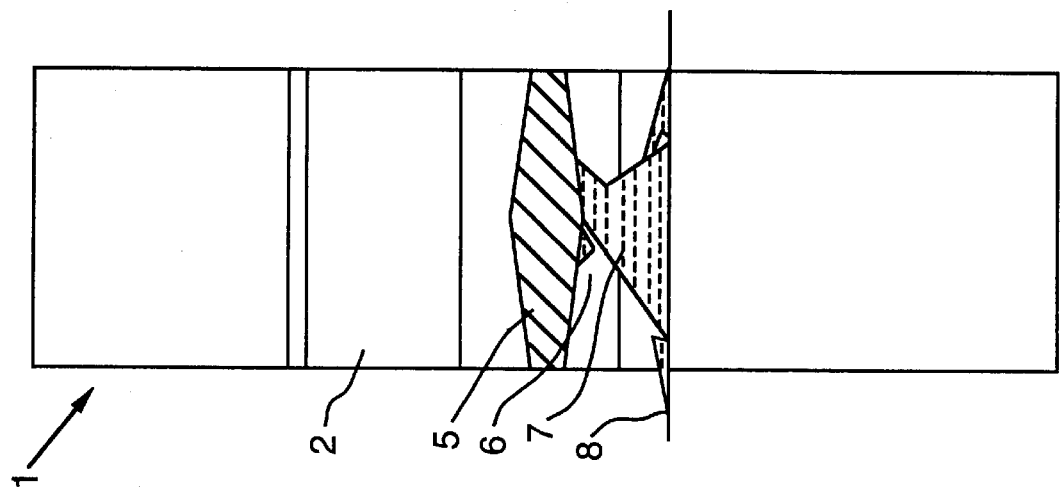
FIG. 11B is a frontal view of the magnetic filter of FIG. 11A.
Figure 11A:
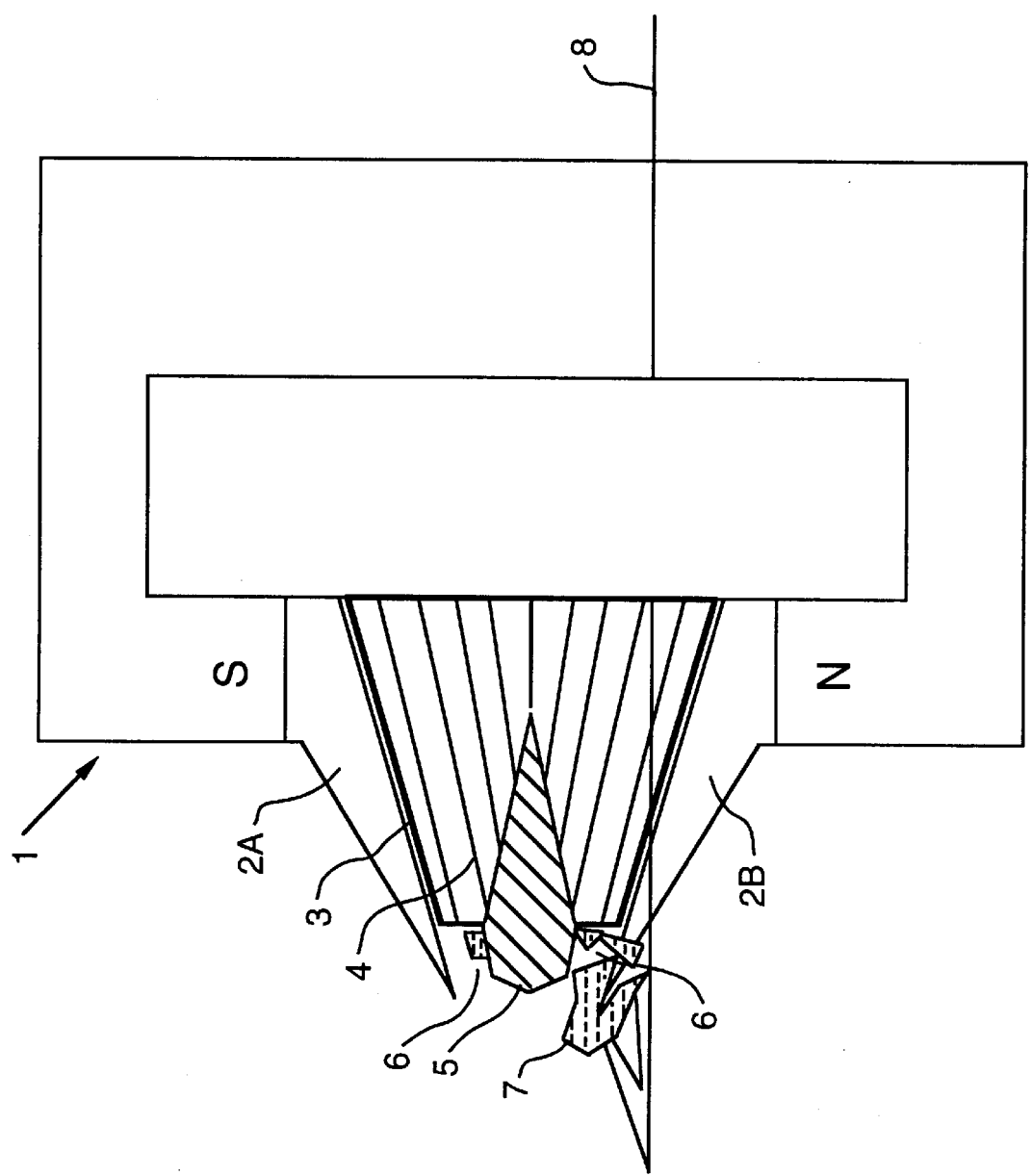
FIG. 11A is a schematic representation of a magnetic filter in partial cross section.

FIGS. 11A and 11B illustrate a side and front projection, respectively, of a filter built into a surface magnetic trap. In this embodiment, a magnetic system with permanent magnet 1 having a south pole piece 2A, and a north pole piece 2B, is fitted with a filter housing 3, which is filled with a filling of soft magnetic wires or springs 4 for high gradient field design. The filter also includes a body of magnetosoft material 5 for achieving a long-range gradient, and an opening 6 for magnetic oil exhaust. In use, magnetic oil 7 from the water surface 8 is drawn into the magnetic trap. Small drops of magnetic oil are attracted to the magnetic wires 4, from where they move slowly to the body 5 and then to the opening 6.

Figure 12:
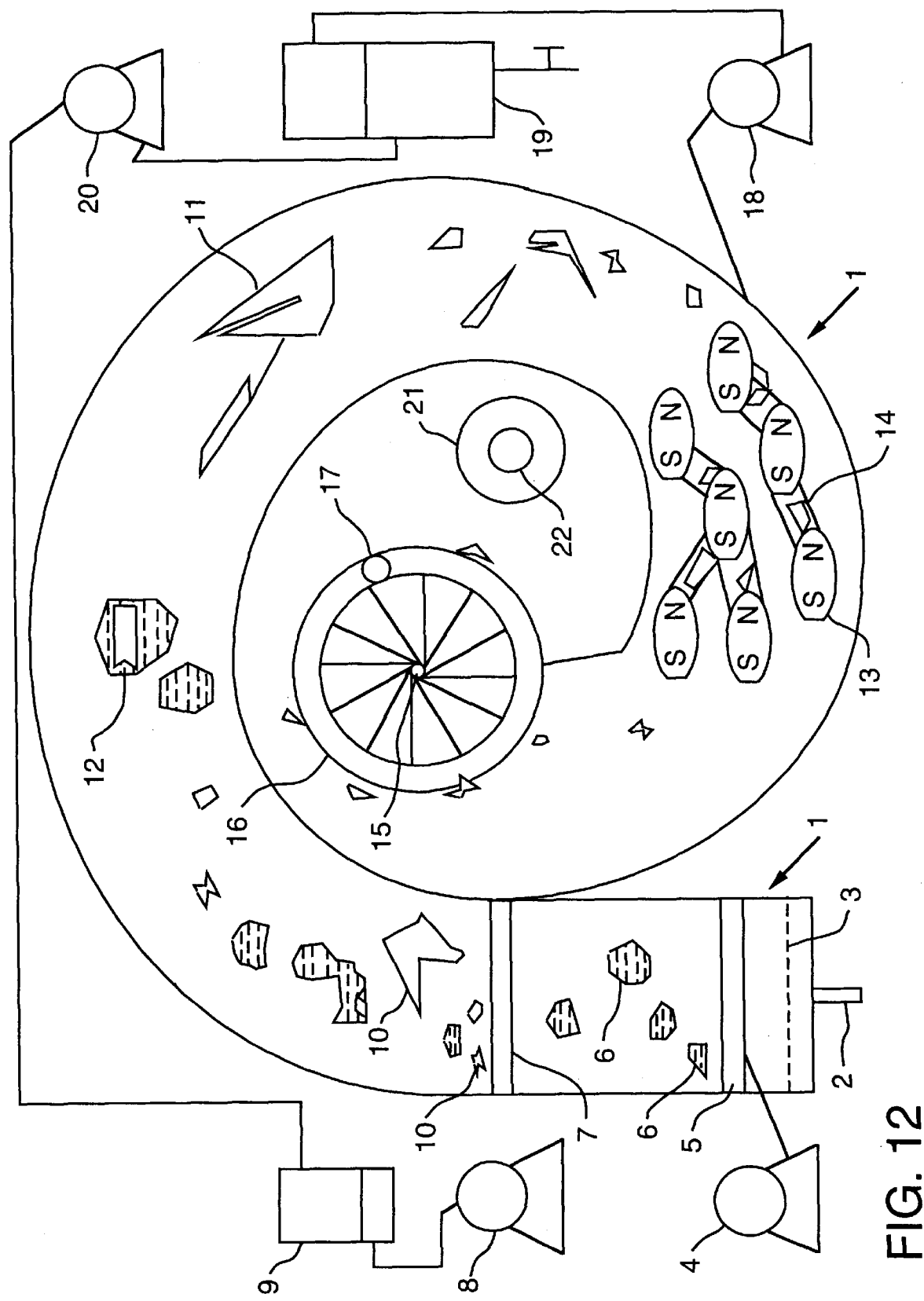
FIG. 12 is a schematic illustration of water cleansing system utilizing a spiral channel of the present invention.

FIG. 12 illustrates another embodiment of the invention comprising a spiral-shaped open channel for surface and volume clearance of oil that might be installed in water treatment systems for treating water following sludge, mud, and sand clarification. The system of FIG. 12 could be used in systems having small flow rates of about 1–10 t/h, for example, industrial washing machines, metal part washing, car washing systems, or as a part of systems with great flowrates on the order of 10–1000 t/h and more, such as for power stations, and the chemical and oil industries. The system of FIG. 12 comprises an open channel 1, an inlet 2 for polluted water, a regulator 3 for equalizing water flow, a system for oil mobilization such as a pump 4, an inlet diffuser or nozzle 5 for oil mobilization using gas or liquid, oil spots 6, an outlet 7 for magnetic colloid feed (for example, for colloid drip feed), having a magnetic colloid feed pump 8, a vessel 9 containing magnetic colloid, magnetic colloid 10, magnetic oil 11, colloid and oil spots not yet mixed 12, and streamlined magnetic traps 13. The system of FIG. 12 also includes collectors 14 for preliminary containment of magnetic oil, a partitioned magnetic trap 15, a collector 16 for the trap 15, a drain 17 for discharging magnetic oil from the collector 16, a suction [vacuum] pump 18 for removing a magnetic oil recovered from the collector 16, a tank 19 for holding recovered magnetic oil, and a pump 20 and control system for magnetic colloid feeding.

The system of FIG. 12 has an open spiral channel with a contaminated water inlet on the greater spiral radius with means for equalizing water flow, such as a few parallel nets positioned in the channel. Not show in FIG. 12 is the high volume magnetic filter and thin inclined sheets with oleophilic strings on the upper parts of the sheets, used for increasing the size of the oil drops, allowing them to rise to the surface. The nozzle 5 injects air, water and/or magnetic colloid tangentially to the water surface in order to mobilize and mix the oil and magnetic colloid. As illustrated, a cascade of streamlined and partitioned magnetic traps 13 are placed nearer to the end of said channel. A semi-immersed wall, not shown, is preferably used for restricting the upper part of the flow; the partition trap may also serve this function.

If a chute such as illustrated in FIG. 12 is used in conjunction with a settling basin, a long channel is not required, as the settling basin may provide a sufficient retention to enable the oil drops to rise to the surface, in which case surface cleaning alone, without filters, may suffice. When a settling basin is used a circular or rectangular channel may be employed instead of a spiral chute. Additionally, it is not always necessary to use a cascade of magnetic traps, as illustrated in FIG. 12, rather a single streamlined or partitioned magnetic trap may be sufficient.

It is convenient, sometimes, to use the magnetic colloid of the invention for thick oil film mobilization.

These systems may be used for utilization of water in a closed loop, for example for said washing systems.

The system of the present invention, particularly the partitioned trap, is particularly useful for cleaning water affected by a catastrophic oil spill, employing the magnetic colloid of the invention. This system may include booms for limiting the area of treatment, means for transporting the magnetic colloid, adding the colloid to the oil, and mixing the oil with the colloid; streamlined or partitioned magnetic traps [skimmers] with means for orienting the magnetic gap near, but slightly above, water level; floating tanks for oil accumulating, placed essentially below the magnetic gaps of the skimmers; devices for transportation of the collected oil; and equipment such as booms, skimmers, tanks, power station, electrical and pump equipment, etc.

The process of magnetic colloid delivery can be organized in substantially the same way as a process of dispersant delivery. The use of the magnetic colloids of the present invention results in definite advantages. The supplementation of a source of catastrophic oil release with a magnetic colloid or magnetic particle covered by a surfactant of the present invention in an amount of about 0.1% by weight based on the weight of the oil, with magnetization of 20 ka/m is sufficient for organization of catastrophic oil collection. For oil mobilization and mixing, fans directed tangentially to the water surface have proven effective. Alternatively, two fans, each rotating in opposite directions, could also be used for oil mobilization and mixing, in which case the fans are directed normally to the water surface. Such an approach is especially useful for mixing the magnetic colloid with oil and directing the mixture to the magnetic trap. An oil velocity-air velocity ratio of about 0.02–0.05 can be achieved using fans. Vacuum pumps can also be used for mobilization and mixing. It may, in certain circumstances, be advantageous to employ both fans and vacuum pumps for oil mobilization and mixing.

It is preferred to use magnetic traps having a weight not exceeding about 100 kg to facilitate the orientation of the magnetic gap relative to the waving (or oscillating) water level.

The system for cleaning water from oil might be used as part of the water clearance system or as a separate system. In the case of cleaning of water from oil, preferably a separate system is employed, comprising an accumulator of oil polluted by water, means for introducing and mixing of a colloid of aqueous solution and magnetic particles into the polluted oil, a high gradient magnetic filter, pipes and pumps for supercharging, i.e., forcing the oil through the filter, a pump with valve for extracting the magnetic water from the filter, and an outlet for the clean oil.

In order to separate a water in oil emulsion or vise versa, a preferred approach uses a system comprising an accumulator of said emulsion, means for introducing and mixing of a water or oil colloid containing magnetic particles, an intermediate holding tank connected to the accumulator and placed within a gradient magnetic field, and necessary pipes and pumps for routing both liquids to different outlets.

It may be convenient in certain situations to place a magnet with a gradient magnetic field directly into the separated emulsion. In the case of cleaning an oil-in-water emulsion, a water-based magnetic colloid would then be used.

The systems of the invention described herein may be applied to waste water treatment at power stations, oil refineries, industrial plants and automotive depots, and for treatment of storm sewage waters and accidental oil release at sea, harbors, ports, rivers, and lakes. The systems of the invention consume little energy, and allow decreased overall cost. The maintenance cost is mainly related to consumption of magnetic colloid, which amounts to 2–3% of the extracted oil products.

Numerous tests have shown that the oil-collecting capacity of the systems of the present invention can amount to 10 t/h at the magnetic trap perimeter at waste water flowrates ranging from 1 to 10,000 t/h. As far as surface clearance is concerned, it is possible using the systems of the present invention to remove oil films with thickness of about 0.01 mm. The cleaning ratio for volumetric clearance may be up to 10,000 if the initial pollution index corresponds to 1,000–10,000 mg/l, and above 100–1,000 if this index is 20–100 mg/l.

FIGS. 13A–13E show schematic diagrams of preferred magnetic skimmers of the present invention. The skimmer, generally 200, consists of two plates, an upper plate 215 and lower plate 216 fabricated of magnetically permeable steel. The plates 215 and 216 face each other and are preferably symmetrical or mirror images of each other as illustrated. The two plates 215, 216 are separated by a central yoke 230 around which an electromagnet 232 is placed. In order to maintain a relatively small gap 210, preferably about 5–60 mm, between the plates with high magnetic forces, it is advisable to employ extra strength to the plates near the center and use reinforcing ribs on the plates. Wider gaps 216 are employed when the magnetic trap 200 is used in condition of high waves, with smaller gaps being possible in calmer waters. Of course, as the gap increases, the overall dimensions of the magnetic trap 200 must also increase to maintain the desired magnetic forces and gradients.

The plates 215, 216 are mounted to the core 230 using the maximum possible bolt circle and number of bolts 234 in order to insure that no air gaps exist between the plates and the central yoke 230 and in order to maintain the necessary spacing of the gap 210. As previously discussed, the lower plate 216 has holes 222 to provide for the collection of magnetic oil once recovered by the trap 200.

Figure 13A:
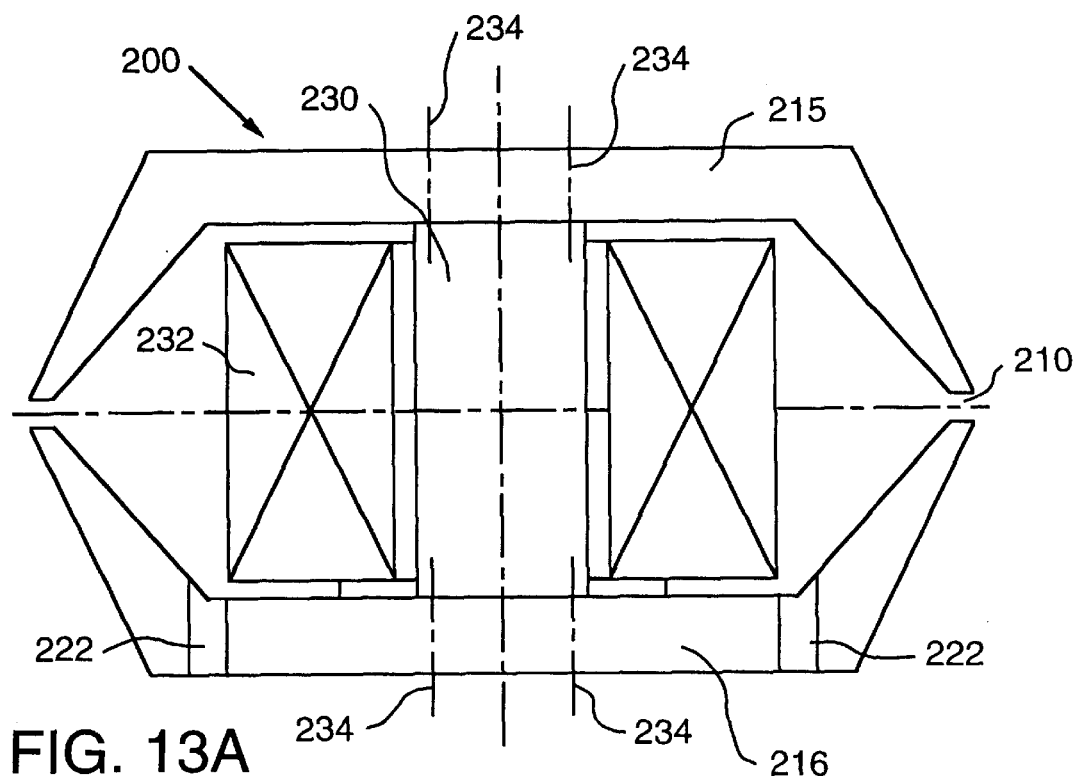
Figure 13B:
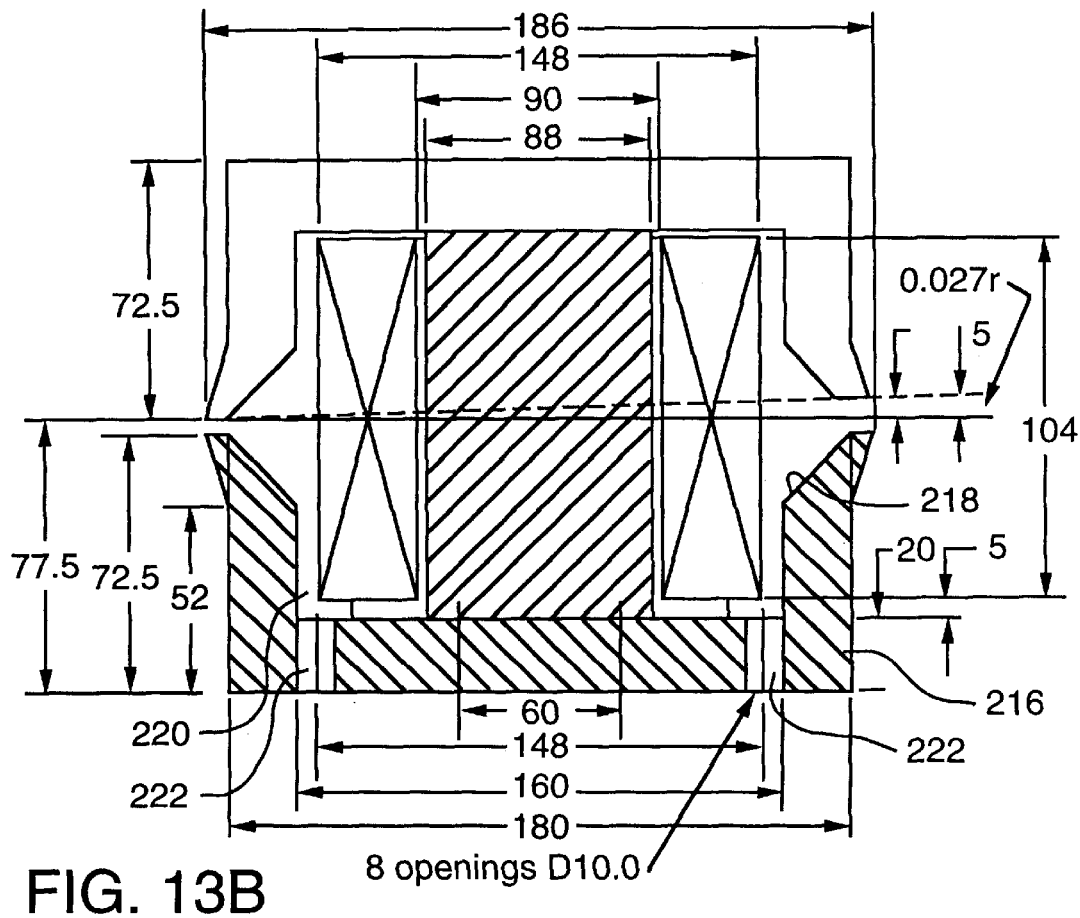
Figure 13C:
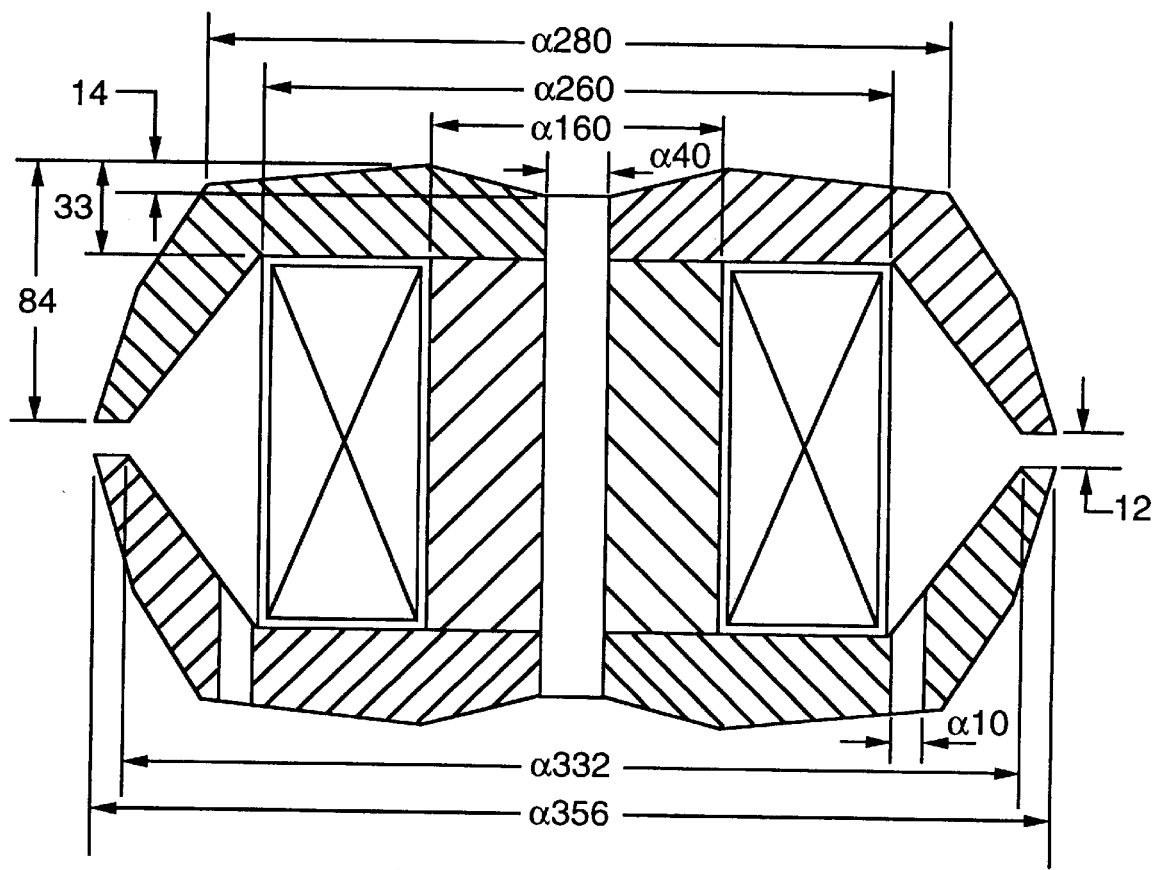
Figure 13D:
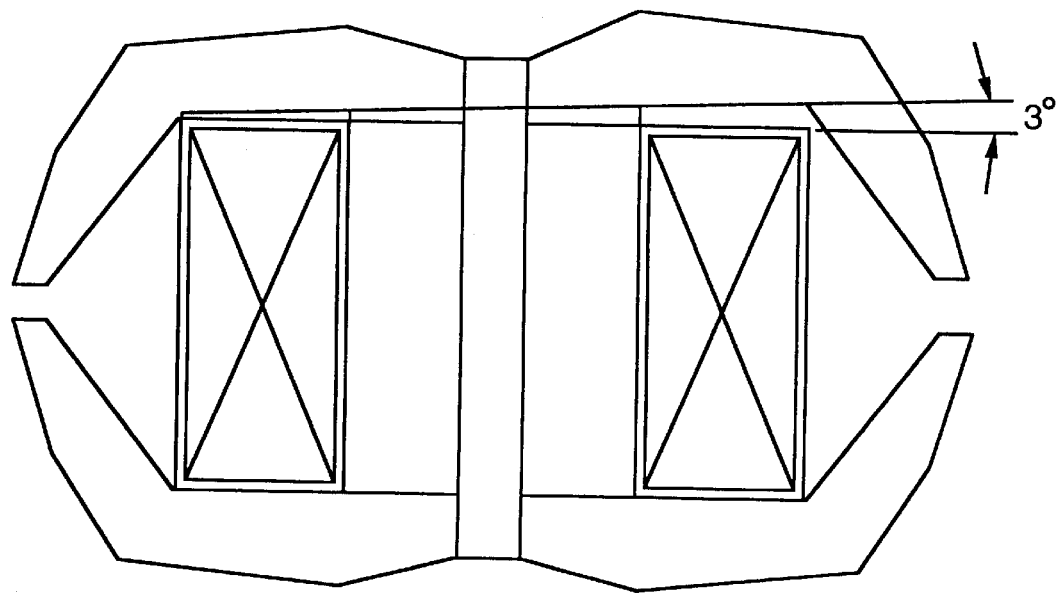
Figure 13E:
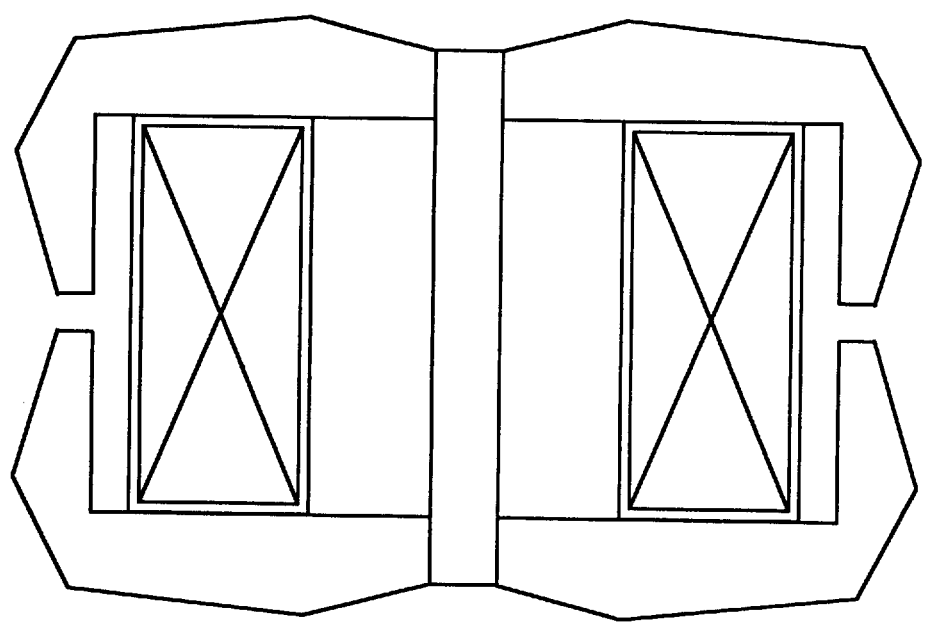

FIG. 13A shows the basic components of a magnetic system of a preferred skimmer; FIG. 13B shows the dimensions of a small model of a skimmer (for small flow rates); FIG. 13C shows a skimmer for larger flow rates with a cavity for a filter; FIG. 13D shows a magnetic skimmer with the gap between the plates varying in this case, by virtue of a 3° offset from parallel as illustrated. Such an offset allows the magnetic oil to accumulate in a preferred region within the trap for extracting the magnetic oil; in this case, oil collected by the magnetic trap will tend to gather in the region of the narrowest gap spacing, from which area the oil may be removed from the trap, for example, by a suction tube in the narrow gap region connected to a vacuum pump. FIG. 13E shows a magnetic skimmer without a cavity for a filter, which skimmer is preferred for use with cleanup of oil spills. FIGS. 14 and 15 illustrate preferred dimensions and specifications for an electromagnetic coil of a small version of the invention. In this embodiment, the electromagnetic coil is 104 mm×58 mm, having 16 layers, each layer having 57 wraps. The coil is made of copper wire of 1.6 mm diameter with a thin coating of insulation on it. The power supply used is rated at 75 watts with a current output of 4.8 amps and voltage output of 15.5 volts. Preferably, the coil is impregnated with a wax or other medium which is impermeable to the water/oil mixture in order to prevent seepage of such mixture into the coil. This is accomplished by winding the coil on a slow-turning lath in order to allow periodic coating of each layer of the coil with a thin layer of wax or other impermeable medium, thereby preventing the water or oil or a mixture of the two from migrating into the coil.

FIGS. 16A and 16B illustrate schematically a preferred apparatus of the present invention for cleaning a contaminated tank, including a magnetic skimmer 400 which may be of the type previously described having a magnetic gap 402 positioned above a water and oil level 404. The skimmer 400 may be mounted on a beam 406 which, in turn, may be mounted on a tank 408. The tank 408 has a water inlet 410 and a water outlet 412 which is connected to a water level controller 414 and a fan system 416 operated to mix the oil and magnetic colloid at the water and oil surface as previously described. The skimmer 400 may include a magnetic oil collector 418 which discharges oil 419 to a collection vessel 420. The skimmer 400 is preferably fitted with a vacuum system 422 which draws collected oil away from the magnetic skimmer 400 and into the magnetic oil collector 418.

The tank 408 may also be fitted with a drain 424. A partition 426, and a semi-immersed partition 428, are preferably employed to control water flow and avoid channeling. FIG. 16B illustrates the system of FIG. 16A from an overhead perspective.

What is claimed is:

1. A skimmer system for separating oil and an aqueous solution from a mixture thereof, comprising a system for imparting magnetic properties to the oil, by delivering a magnetic component to the oil to be mixed therewith, and a first magnetic trap including at least a pair of spaced-apart magnetically permeable plates having a gap therebetween and capable of imparting a gradient magnetic field at said gap, said gap being positioned slightly above the surface of said oil and aqueous solution mixture, said gradient magnetic field having a directional component which draws said oil imparted with magnetic properties through said gap and into said trap, thereby extracting the oil imparted with magnetic properties from the surface of said aqueous solution, said trap including an oil collection sump located below said gap.

2. The system of claim 1, wherein said magnetic component comprises a magnetic colloid.

3. The system of claim 2, wherein said magnetic colloid comprises magnetic particles having a size of 50–100 Angstroms, dispersed in a liquid carrier.

4. The system of claim 3, wherein said magnetic colloid further comprises a multi-layer surfactant.

5. The system of claim 4, wherein the magnetic particles are selected from the group consisting of magnetite, berthollide or maghemite particles; the magnetic colloid includes a liquid carrier selected from the group consisting of kerosene, aromatic hydrocarbons, machine and lubricating oils, and the multi-layer surfactant is selected from the group consisting of oleic acid, stearic acid, hehadecanoic acid and fatty acids.

6. The system of claim 2 wherein said magnetic colloid includes magnetic particles having an average diameter of less than 200 A° and said colloid comprises an oil-based liquid-carrier with an excess of hydrophobic oleophilic surfactant, with the concentration of said magnetic particles being such that said colloid has a density less than water.

7. The system of claim 6, wherein said colloid oil-based liquid-carrier is kerosene, said surfactant is oleic acid, and said magnetic particles are of magnetite.

8. The system of claim 6, wherein said colloid oil-based liquid-carrier comprises oil extracted from said mixture.

9. The system of claim 1, where said gradient magnetic field comprises two directional components, a first directional component directed along the surface of said mixture, and a second directional component directed vertically and opposing gravitational forces.

10. The system of claim 1, wherein said magnetic trap includes oil collector means connected to said sump and having suction means for removing collected oil from said collector means.

11. The system of claim 1, wherein a plurality of magnetic traps are provided and said mixture flows past said plurality of magnetic traps.

12. The system of claim 1, wherein said magnetic trap includes partition means for partitioning off part of the mixture.

13. The system of claim 1 further including a magnetic filter having in combination a high gradient short-range magnetic field for attracting small drops of magnetic oil and a long-range gradient magnetic field directed opposite gravity.

14. The system of claim 13, wherein said high gradient magnetic field is achieved with a filling of magnetic material positioned in an external magnetic field.

15. The system of claim 13 wherein said high gradient magnetic field is achieved by passing an electric current through a plurality of small diameter wires.

16. The system of claim 13 wherein said magnetic filter is mounted in an external magnetic field created by the magnetic traps of said system.

17. A system for separating oil and an aqueous solution from a mixture thereof, said system including an open spiral channel having a greater radius spiraling to a lesser radius, said channel having a contaminated water inlet on the greater spiral radius of said channel, means for providing a magnetic colloid to said system, means for mobilizing and mixing said magnetic colloid with said oil, prior to said oil entering a magnetic filter of said system, means for controlling the addition rate of said colloid to said system, second magnetic trap means comprising a cascade of streamlined and partitioned magnetic traps placed proximate the smaller radius of said channel, but spaced from said first magnetic trap means, said first magnetic trap means positioned at the end of said channel lesser radius, a partly immersed wall for limiting the flow of the upper part of the mixture through the system, control weirs for polluted water level arrangement, a magnetic filter mounted in a partition of said first magnetic trap means, collector means for collecting recovered magnetic oil, and pump means for transporting collected magnetic oil from said collector means to a holding tank.

18. The skimmer of claim 1, wherein said gap is offset by virtue of said magnetically permeable plates being non-parallel with respect to each other.

19. The skimmer of claim 18, wherein said offset is about 3 degrees.

20. The skimmer of claim 1, wherein said gap is adjacent an inclined surface down which oil collected by said trap flows for collection.

21. The skimmer of claim 20, wherein said magnetically permeable plates are offset from parallel with respect to one another.

22. The skimmer of claim 21, wherein said offset is about 3 degrees.

* * * * *